June 24, 1924.
H. A. BLAIR
1,499,147
SAFETY APPLIANCE FOR AEROPLANES
Filed Feb. 28, 1924
3 Sheets-Sheet 2
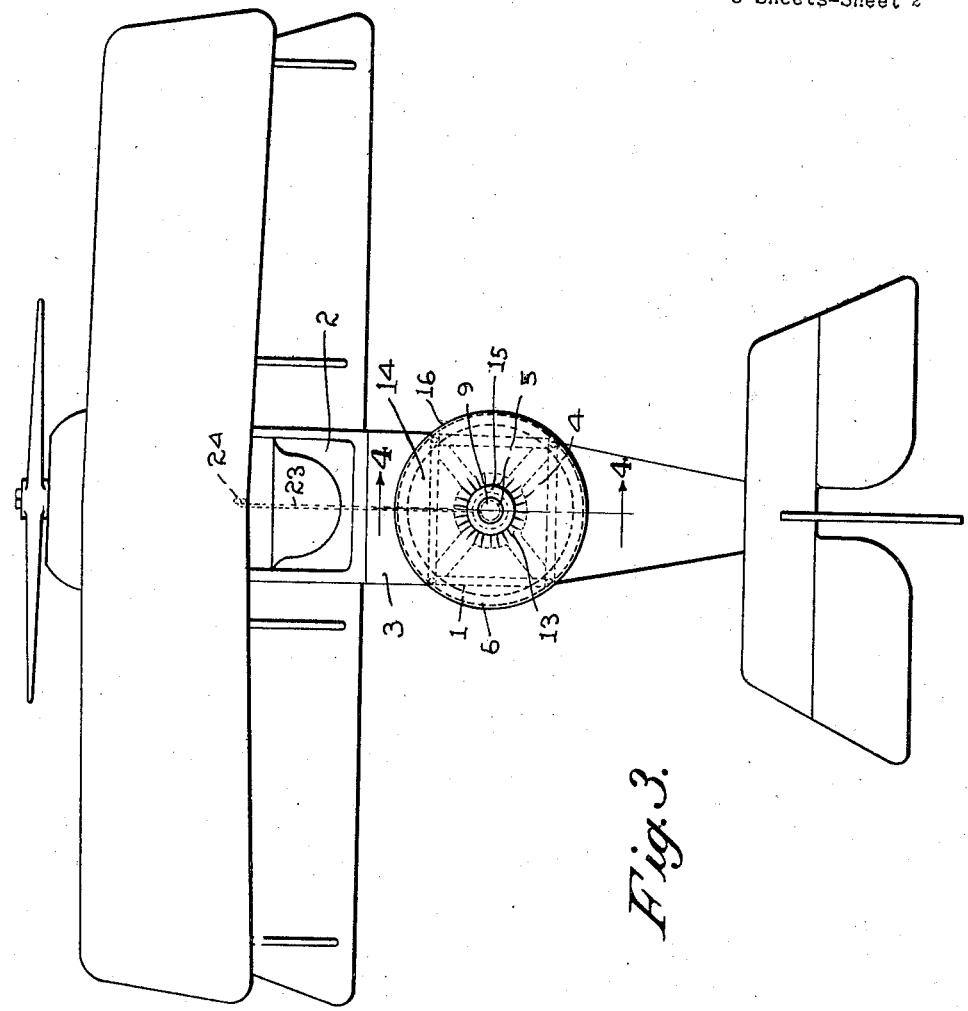
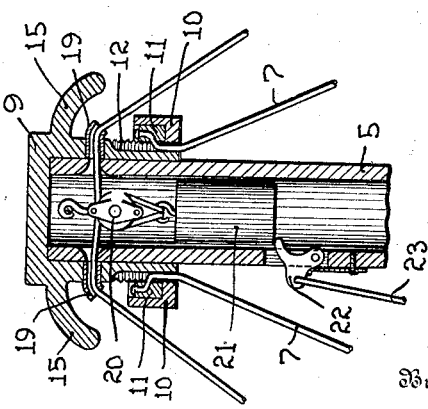
Inventor
H. A. BLAIR
By
Attorney

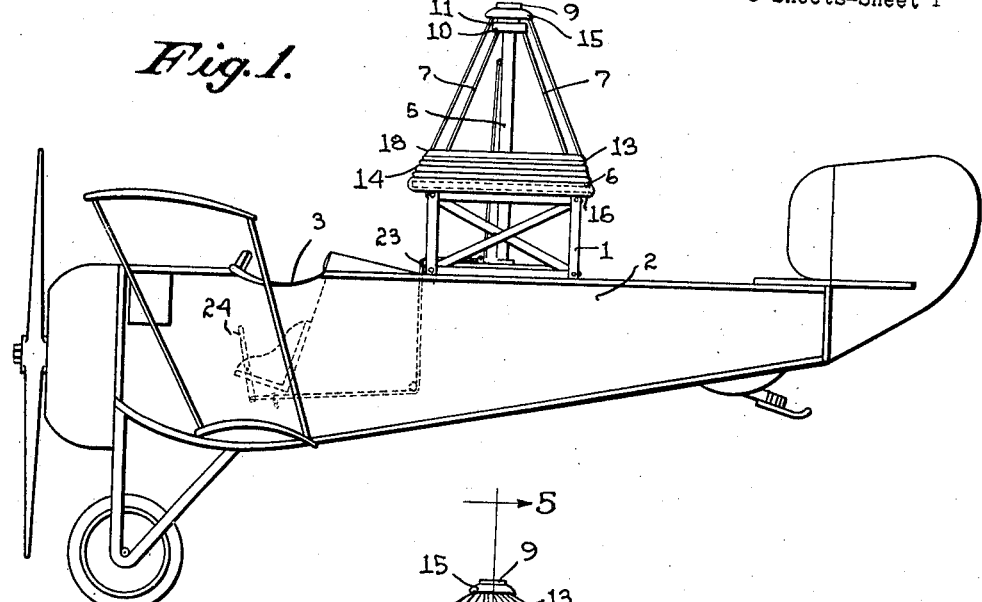

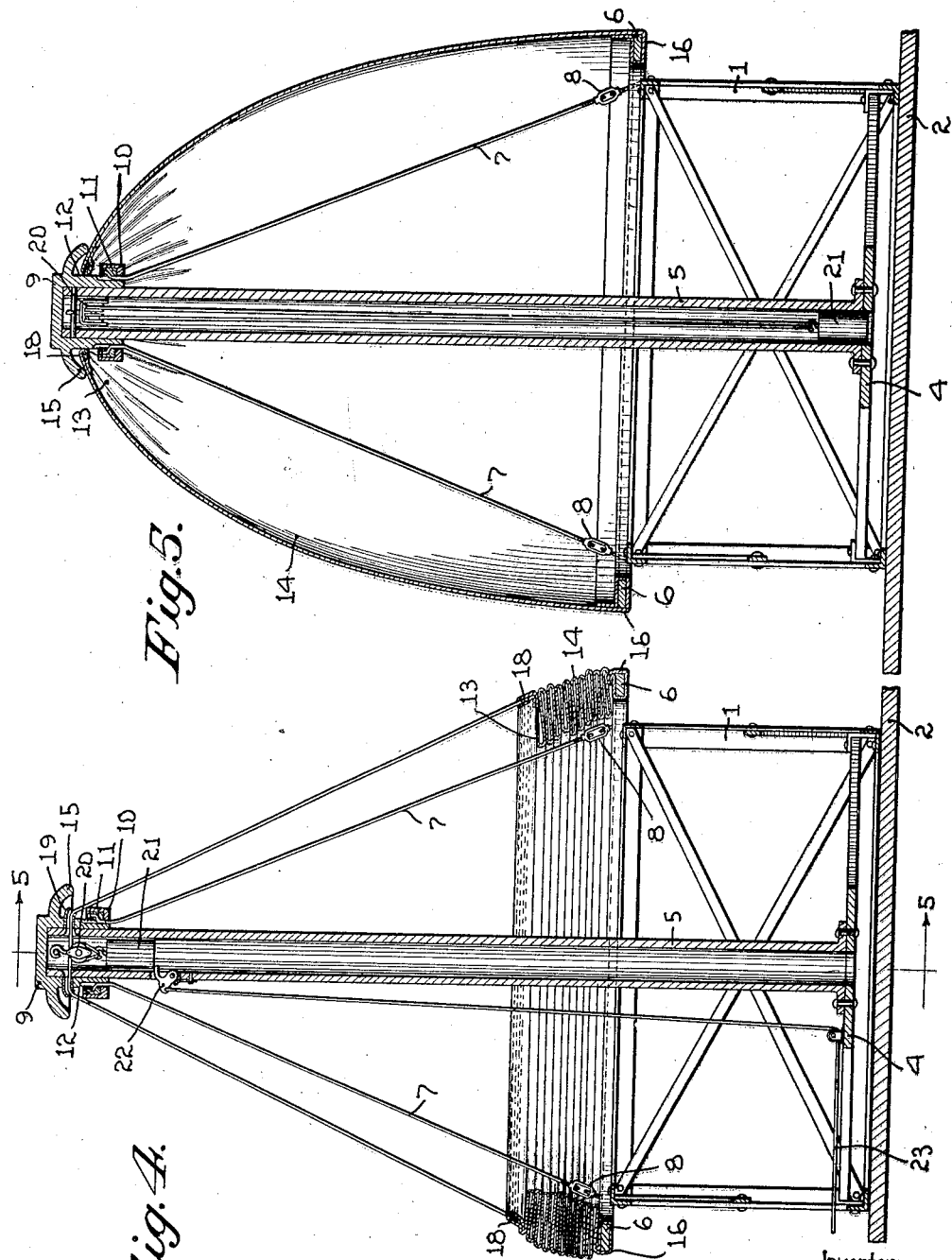

Patented June 24, 1924.

1,499,147

UNITED STATES PATENT OFFICE.

HUGH A. BLAIR, OF PADUCAH, KENTUCKY, ASSIGNOR OF ONE-THIRD TO HENRY BASLER AND ONE-THIRD TO F. N. GARDNER, BOTH OF PADUCAH, KENTUCKY.

SAFETY APPLIANCE FOR AEROPLANES.

Application filed February 28, 1924. Serial No. 695,814.

*To all whom it may concern:*

Be it known that HUGH A. BLAIR, a citizen of the United States of America, residing at Paducah, in the county of McCracken and State of Kentucky, has invented new and useful Improvements in Safety Appliances for Aeroplanes, of which the following is a specification.

It is well known that at times motors on airships or aeroplanes go dead or the craft is damaged either from an aerial attack or otherwise or possibly the pilot or operator may lose control of the craft which causes the craft to make an unauthorized descent which results in wreckage of the plane and very often death to those operating the same.

While attempts have been made to retard an unauthorized descent of an aircraft, allowing the same to descend slowly, there are many disadvantages present in the construction of devices resulting from the attempts. For instance, in all the devices heretofore designed parachutes are used in floating positions above the plane, requiring considerable time not only to release the parachutes but also in allowing them to arrange in proper positions above the plane. Certain of the parachutes entangle with others in arranging in position and at times the parachutes are prevented from opening. An aircraft may fall a considerable distance while the parachutes are being released and allowed to assume supporting positions and even then the descent of the craft may not be retarded sufficiently to avoid damage to the craft and possibly death to the pilot or operator.

Some of the devices heretofore designed include parachutes which automatically detach from the craft and at the same time lift the pilot or operator from the cockpit of the body or fuselage of the craft. This scheme has its disadvantages in that the craft in making an unauthorized descent may make a tail spin or a nose dive, and under these conditions it would be difficult for the parachute to open and properly detach from the craft, as well as difficult to withdraw the occupant from his position in the cockpit.

The present invention has for its purpose to provide, in a safety appliance for aeroplanes, a construction wherein the above-named disadvantages and difficulties are avoided. Especially in the present device, it is the aim to provide means to permit the parachute to open immediately and position itself closely in an open position above the plane, there being means provided to allow the parachute to readily fill with air.

Another purpose is to provide means for automatically causing the parachute to open, there being suitable means afforded and manually actuated for permitting the opening means to open the parachute.

Still another purpose is the provision of means to prevent the escape of air at the top of the parachute when the parachute is being opened and at the same time closed at the top.

A further purpose is to provide means for permitting the opening means to freely operate to insure opening the parachute and closing it at its upper end to prevent the escape of air.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in side elevation of an airship or aeroplane, showing the improved safety appliance applied in accordance with the invention.

Figure 2 is a view of an aeroplane showing the safety appliance open and acting to retard the unauthorized descent of the aircraft.

Figure 3 is an enlarged plan view of Figure 1, especially that part of the airship where the safety appliance is attached.

Figure 4 is an enlarged sectional view on line 4—4 of Figure 3 not only showing the central supporting pole for the parachute but also showing the means for opening the parachute and insuring closing the upper end thereof when open and also illustrating the parachute lowered in its folded position.

Figure 5 is an enlarged vertical sectional view on line 5—5 of Figure 2, showing the parachute open and in an operative position with its upper end closed.

Figure 6 is an enlarged detail view in section of the upper end of the hollow pole which assists in supporting the parachute when open.

Referring to the drawings, 1 designates a frame which may be any suitable construction, any proportions and may be applied to any convenient part of the aircraft, suitable for the purpose of retarding an unauthorized descent. In the present device, the frame is applied to the fuselage or body 2 of the aircraft immediately to the rear of the cockpit 3, although it may be applied over the cockpit, and rising from a spider support or bottom 4 at the base of the frame is a hollow support or column 5. Where the column attaches to the spider, the spider is open so as to permit air to enter the column, especially during an unauthorized descent of the craft.

Mounted on the frame is a ring 6 which may be constructed of any suitable metal, preferably aluminum owing to its lightness, and connected to the ring and rising convergently toward the column is a plurality of guy wires or rods 7. Suitable turnbuckles 8 may be used for connecting the guy wires or rods to the ring.

Carried by the upper end of the column is a head 9 to which the wires are connected, for instance, as by means of a clamping ring 10 which also acts to tighten all four wires simultaneously. This clamping ring also has a slip ring 11 in notches of which wires engage when screwing up the ring 10. The wires where they are connected to the head merge uninterruptedly into the surface 12 of the head. This construction is provided for the purpose of permitting the closing end 13 of the parachute 14 to engage readily with the head as it is opened and at its upper end automatically closed. As the parachute is raised and opened and allowed to fill with air, its upper end gradually closes and draws tighter and when the end is entirely closed, it engages snugly with an overhanging collar 15 which is carried by the head of the column.

The lower end of the parachute is provided with a fold 16 through which the ring passes and it will be noted that the ring at the bottom is of a substantial diameter protruding beyond the sides of the rectangular frame which rises from the body or fuselage of the aircraft and due to this substantial diameter air is allowed to pass between the ring and the frame and therefore collect under the parachute. Obviously, when the parachute finally closes at its upper end, the air, as it is passing through the parachute during the unauthorized descent of the craft, is trapped by the time the upper end of the parachute closes tightly against the overhanging collar. Obviously, as the air is trapped, the craft is substantially retarded during its descent.

The open end of the parachute which automatically closes as it is automatically raised has a fold 18 for the reception of a draw rope or cord which causes the parachute to shirr, as its upper end closes and these draw ropes or cords pass through bushings 19 which are fastened to the collar, the openings in the bushings registering with openings in the collar, whereby the draw ropes or cords may pass over suitable pulleys 20 mounted in the upper end of the column and are, in turn, connected to a suitable weight 21 which is guided in the column. A suitable retaining device 22 is mounted in the upper end of the column and operatively engages with the weight when the weight is in a raised position and the parachute is lowered and folded adjacent the ring at the base of the guy wires.

An actuating rod 23 is connected to the retaining device and its other end terminates in a handle 24 disposed in close position to the operator or pilot whereby the device may be actuated for releasing the weight. As soon as the pilot is aware that the craft is making an unauthorized descent, the handle may be grasped and the weight released which will immediately pull upon the draw cords or ropes and not only raise the parachute to an open position so as to entrap the air therein but also automatically close the upper end of the parachute against the collar, thus retarding the descent of the craft. The upper end of the column is closed so as to prevent the passage of air therethrough which would otherwise lessen the retardation of the craft. The lower end of the column is open so that air can enter which will not only assist in retarding the plane but will allow the weight to drop freely.

The invention having been set forth, what is claimed is:

1. In a safety appliance for aircraft, the combination with a normally collapsed parachute, of a supporting frame therefor, a column rising from the frame, said parachute being normally open at its upper end and provided with closing means, and gravity means operatively connecting with the closing means for drawing the open end tightly about the upper end of the column during the initial unauthorized descent of the aircraft.

2. In a safety appliance for aircraft, the combination with a frame, of a column rising therefrom, a parachute with its upper and lower ends normally open, and gravity means operatively connecting with the upper open end for automatically closing the same closely about the upper end of the column at the initial movement of an unauthorized descent.

3. In a safety appliance for aircraft, the combination with a frame, of a column rising therefrom, a parachute with its lower open end attached to the frame and provided with an upper automatically closing opening, and means to be released for causing the upper end to automatically close about the upper end of the column.

4. In a safety appliance for aircraft, the combination with a frame, of a column rising therefrom, a parachute with its upper and lower ends normally open, gravity means operatively connecting with the upper open end for automatically closing the same closely about the upper end of the column at the initial movement of an unauthorized descent, and means at the top of the column to insure preventing the escape of air in the parachute.

5. In a safety appliance for aircraft, the combination with a frame, of a column rising therefrom, a parachute with its lower open end attached to the frame and provided with an upper automatically closing opening, means to be released for causing the upper end to automatically close about the upper end of the column, and passages or openings located beyond the sides of the frame to permit the passage of air into the parachute as it is elevated whereby, as the upper end closes, the air may be entrapped in the parachute.

6. In a safety appliance for aircraft, the combination with a frame, of a column rising therefrom, a parachute with its upper and lower ends normally open, gravity means operatively connecting with the upper open end for automatically closing the same closely about the upper end of the column at the initial movement of an unauthorized descent, means at the top of the column to insure preventing the escape of air in the parachute, and passages or openings located beyond the sides of the frame to permit the passage of air into the parachute as it is elevated whereby, as the upper end closes, the air may be entrapped in the parachute.

7. In a safety appliance for aircraft, the combination with a frame, of a column rising therefrom, a parachute having its upper and lower ends normally open, the lower end being attached to the frame, draw ropes carried by the upper open end for tightening the upper end about the upper portion of the column, means at the upper end of the column with which the upper opening of the parachute engages to insure against escape of entrapped air in the parachute, guiding means for the draw ropes, and means operable in the column and connected to the draw ropes for automatically raising and closing the upper end of the parachute against the means which prevents the escape of air.

8. In a safety appliance for aircraft, the combination with a frame, of a column rising therefrom, a parachute having its upper and lower ends normally open, the lower end being attached to the frame, draw ropes carried by the upper open end for tightening the upper end about the upper portion of the column, means at the upper end of the column with which the upper opening of a parachute engages to insure against escape of entrapped air in the parachute, guiding means for the draw ropes, means operable in the column and connected to the draw ropes for automatically raising and closing the upper end of the parachute against the means which prevents the escape of air, means for retaining the raising and closing means in an elevated position in the column, a manually actuated device for releasing said retaining means, and openings at the base of the parachute to permit air to pass into and be entrapped in the parachute as it rises and closes at its upper end.

In testimony whereof he affixes his signature.

HUGH A. ✕ BLAIR.
his mark

Witness to signature of Hugh A. Blair:
ARTHUR Y. MARTIN.